UNITED STATES PATENT OFFICE.

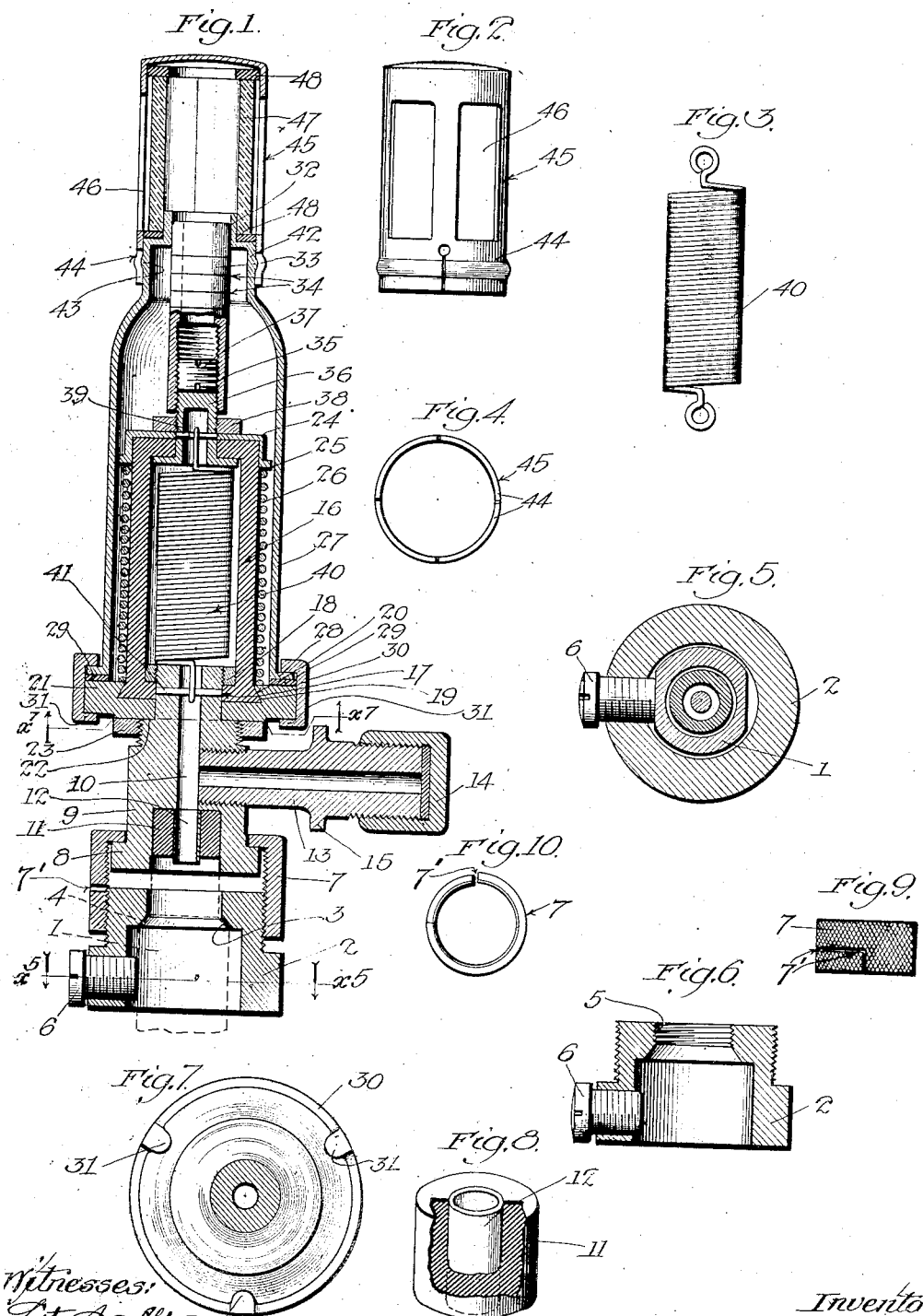

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

PRESSURE-GAGE.

1,354,017.                      Specification of Letters Patent.      Patented Sept. 28, 1920.

Application filed August 13, 1912, Serial No. 714,897. Renewed December 7, 1918. Serial No. 265,786.

*To all whom it may concern:*

Be it known that I, JUNIUS A. BOWDEN, a citizen of the United States, residing at Los Angeles, in the county of Los Angeles and State of California, have invented a new and useful Pressure-Gage, of which the following is a specification.

This invention relates to pressure gages which are attached to and carried by the tire while the tire is in operation, enabling the pressure of the tires to be determined instantly by merely looking at the gage. In a previous application of mine filed December 18, 1911, Serial No. 666,601, I have shown such a gage and the present invention has for its object to furnish several improvements thereon.

One object of the improvement is to provide for adjusting the gage bar with respect to the air chamber.

Another object is to improve the shape of the air chamber.

Another object is to decrease the length of the gage.

Another object is to provide a non-collapsible insertible gasket.

Another object is to form a stop shoulder on the attaching sleeve.

Another object is to form a stop flange on the lateral tube.

Another object is to provide improved means for securing the shield, making it less expensive and quickly attachable.

Referring to the drawings:

Figure 1 is an enlarged longitudinal section through the gage.

Fig. 2 is a side elevation of the detachable shield.

Fig. 3 is a side elevation of the spring.

Fig. 4 is a bottom view of the shield.

Fig. 5 is a section on line $x^5$—$x^5$ Fig. 1.

Fig. 6 is a detail sectional view through a modified form of the attaching sleeve.

Fig. 7 is a section on line $x^7$—$x^7$ Fig. 1.

Fig. 8 is a perspective partly in section showing the non-collapsible gasket.

Fig. 9 is a side elevation of a coupling for connecting the gage to a tire valve.

Fig. 10 is an inverted plan of said coupling.

1 is the nipple of the tire valve to which the gage is attached by means of an attaching sleeve 2, having an internal shoulder 3 which strikes the shoulder 4 on the nipple 1 and forms a positive stop to enable the attaching sleeve to be placed in the exact position required. The attaching sleeve may be internally threaded as shown at 5, in Fig. 6, so that it can be secured on the end of the nipple 1. A set screw 6 is provided to secure the sleeve. With the unthreaded sleeve as shown in Fig. 1, the sleeve in the assembled gage slides over the threads of the tire valve.

Screwed on the attaching sleeve 2 is a flanged coupling 7 which is revoluble on a flange 8 on the lower end of a body 9. The body 9 has a central air conduit 10 and is recessed at one end to receive a gasket 11 of rubber or other suitable material for fitting against the end of the nipple 1 to make an air-tight joint. In order to prevent the gasket from collapsing and closing the central air passage through it, a tube 12 is inserted which forms a lining and prevents the rubber from squeezing together and reducing the size of the hole. This is an important feature and it also enables the gasket to be easily removed or inserted, as the tube and gasket are used as a unit, yet separately inserted or detached.

A lateral tube 13 communicates with the conduit 10 and extends from the side of the body 9 enabling a hose to be attached for inflating the tire without removing the gage. A cap 14 is screwed on the end of tube 13. The tube is provided with a flange 15 which acts as a stop to prevent the inflating hose or attachment being pushed too far over the tube 13, which would make it difficult to withdraw.

A rubber air chamber 16 is secured to the upper end of body 9 and communicates with air conduit 10. The air chamber 16 has an internal flange 17 which is engaged by a flange formed by a nut 18 screwed on the end of body 9, and an external sloping shoulder 19 on said air chamber engages in an undercut recess 20 formed in a disk 21 which fits over the upper end of body 9 and rests on a shoulder 22. The flange 17 and shoulder 19 are held tightly in place against the nut 18 and recessed portion 20 of the disk 21 by nut 23, screwing on body 9, said nut 9, when tightened, pressing upwardly against the underside of the disk 21. A recessed cap 24 is on the upper end of the air chamber and has a flange 25 which forms a guide and also an abutment for keeping wire coils 26 in place, the latter encircling the air chamber to prevent lateral expansion of the walls of the air chamber. The lower end of coil 26 is confined by disk 21.

A barrel 27 has a flanged lower end 28 which rests on the disk 21, with a gasket 29 between, and is securely held by a flanged sleeve 30 which has three prongs 31 which are bent under the disk 21. The upper end of the barrel is contracted at 32 and sliding therein is a hollow gage bar 33 provided with indicating marks 34, and having one internally threaded end 35 which is screwed to a flanged stud 36, a lock screw 37 being screwed against the top of the stud 36. The threads of the lock screw 37 engage the internal threads of the hollow gage bar, the lock screw being screwed into place by a screw driver inserted through the end of the gage bar. The flanged end of stud 36 is within the upper end of the air chamber and a nut 38 securely locks the air chamber and cap 24 and stud 36 together so that no air can escape at this point, said cap and stud forming a closure means for the upper end of said chamber. A pin 39 in the stud 36 engages the upper end of a coil extension spring 40, the lower end of the spring engaging a pin 41 in the body 9. The spring 40 interposes the proper resistance to the outward expansive movement of the air chamber and being inside the air chamber materially reduces the length of the gage.

The gage bar may be adjusted with respect to the air chamber by its screw connection with the stud 36, so that a given mark 34 will be visible when a corresponding pressure is in the air chamber.

The upper end of the barrel has an intermediate reduced portion 42 with a bead 43 which is detachably engaged by grooved spring sections 44 formed integral with a shield 45 having segmental openings 46 to reveal the gage bar. A glass tube 47 is within the shield and gaskets 48 at both ends of the glass tube effectually exclude dust and moisture. If a glass tube breaks the shield may be readily detached to replace the broken tube.

Coupling 7 is preferably slitted as shown at 7' in the form of a bayonet joint and the end of the slitted portion bent in as shown in Fig. 10, to grip the thread on body 9 and hold the gage tightly in place.

What I claim is:

1. In a pressure gage, a barrel with a bead formed near its outer end, a shield with spring sections formed with a groove engaging said bead, a gage bar adapted for projecting from the barrel within the shield, and a glass tube between the shield and gage bar when projecting.

2. In a pressure gage, a rubber air chamber, a threaded stud engaging an end thereof, a tubular gage bar extending longitudinally from the air chamber, and having a hollow internally threaded end adjustably screwed on said stud, and means within said hollow end for locking the gage bar to the stud.

3. In a pressure gage, a body, a disk on said body, said disk having an undercut annular recess, a rubber air chamber with an external sloping shoulder fitting in said recess and having an inwardly directed flange, means on said body engaging the inner flat face of the flange of said air chamber, and a nut screwing on the body and bearing against the disk for securing the foregoing parts in airtight engagement with each other.

4. In a pressure gage, a body, a pin in the body, a rubber air chamber attached to the body, a spring within the air chamber, a flanged stud at the upper end of the air chamber, a pin in said stud, the ends of the spring being attached to said pins.

5. In a pressure gage, a body, a disk thereon, a barrel with a flange, a flanged sleeve engaging the flange of the barrel, the sleeve having prongs bent under the disk, and means securing the disk to the body and holding the parts together.

6. In a pressure gage, a cylindrical rubber air chamber with an opening at each end, an abrupt internal shoulder formed integral with said chamber at each end thereof, and means engaging the flange at one end for securing the body to a tire valve, and means engaging the flange at the other end for securing a gage bar thereto.

7. In a pressure gage, a cylindrical rubber air chamber with an opening at each end, an abrupt internal shoulder formed at each end thereof, means for connecting a gage bar at one end of the chamber, the other end of the chamber having an external shoulder, means for attaching said end having the external shoulder to a body, and means for connecting the body to a tire valve.

8. In a pressure gage, a cylindrical rubber air chamber, having an opening at its inner and outer ends, an internal shoulder at both ends, the inner end having means for connecting the chamber to a body, closure means at the outer end of the air chamber, comprising a detachable cap with a central hole, a flanged stud, the flange of said stud bearing against the inner face of the shoulder in the outer end of the chamber, the stud projecting through the opening in the outer end of the air chamber and projecting through the hole in the cap, and means for drawing the flanged stud whereby said cap and shoulder are bound in air tight engagement with each other, a gage bar, means yieldingly resisting outward movement of the gage bar, means for connecting a gage bar to the said closure means at the outer end of the air chamber, and means for connecting the body to a tire valve.

9. In a pressure gage, a rubber air chamber, a stud with a flange inside the air chamber, said stud projecting outside the air chamber, a gage bar secured to the stud, and a lock screw within the gage bar and bearing against the stud.

10. A pressure gage for pneumatic tires, comprising a longitudinally extensible pressure responsive element, said pressure responsive element comprising an elastic tube, and a coiled spring for opposing movements of said tube, the coiled portion of said spring being arranged inside of and being of less length than said tube.

11. In a pressure gage, a supporting body, a flange thereon, a disk on said body below said flange, said disk having an annular recess, an expansible air chamber with a flange below said first flange and seated in said annular recess, and a nut on said body for forcing said flange on the body and said disk toward each other to bind the flange of the air chamber therebetween within said recess.

12. In a pressure gage, a supporting body, a flange thereon, a disk on said body below said flange, said disk having an annular recess, an expansible air chamber with a flange below said first flange and seated in said annular recess, a nut on said body for forcing said flange on the body and said disk toward each other to bind the flange of the air chamber therebetween within said recess, a barrel surrounding the air chamber, a cap slidable in the barrel and secured to said air chamber for guiding the latter, a gage bar slidable in and protruding from said barrel and having coöperative engagement with the air chamber, and a spring opposing outward movement of the gage bar.

13. In a pressure gage, a body, a rubber air chamber on said body, a gage bar having an operative engagement with said air chamber, a barrel inclosing the air chamber, said gage bar being slidable outward through the upper end of the barrel, means for resisting outward movement of the gage bar, a transparent cylindrical tube on the end of said barrel adapted to receive the end of said gage bar and expose said end to view, and a cylindrical shield secured to the barrel outside the glass tube and protecting said transparent tube, said shield having segmental openings, and being secured at its inner end to the barrel.

14. In pressure gages for tires, a tubular metal body having a flange on its outer end and threaded below the flange, a rubber air chamber having an inner flange at one end, the lower portion of the flange of said body adapted to bear against the upper portion of the flange of said chamber, a disk having a central opening, the flanged end of the air chamber resting on the upper part of said disk, said body slidably engaging the opening in said disk, a nut on the said threaded part of the body and acting on the disk to force it toward the body flange and so clamp the flange of the air chamber between the flange of the body and the disk to form between these parts an air tight engagement, a barrel surrounding said air chamber, a gage bar adapted to be moved by the outer end of said chamber and protruding from the outer end of said barrel, means for resisting outward movement of the gage bar, the lower end of said body adapted to be connected with the inlet tube of a tire.

15. In a pressure gage for tires, a barrel, the outer end of said barrel being open and contracted to have two diameters, the outermost diameter being the lesser, a gage bar slidable in the outermost contracted portion, means within the barrel responsive to air pressure for moving the gage bar in one direction, means resisting this movement of the gage bar, there being a shoulder formed on the contracted end of the barrel between the portions of different diameters, a glass tube with its end resting against said shoulder, a metal tube secured to the contracted portion of larger diameter, and housing said glass tube, the metal tube having segmental openings to expose the glass tube, the outer end of the metal tube supporting the outer end of the glass tube and retaining the glass tube in place.

16. In a pressure gage, a body, a flange thereon, a rubber air chamber with an inwardly directed flange surrounding the body and abutting the first flange, a disk surrounding the body and bearing against the opposite face of the air chamber flange, and means for forcing said disk toward the body flange to bind the air chamber flange therebetween.

17. A pressure gage comprising a barrel open at its inner and outer ends, the outer end of the barrel being contracted and provided with a shoulder on the contracted portion, a glass tube with its inner end resting against said shoulder, a shield over the outer end of said tube and extending longitudinally outside the tube, said shield being secured to said barrel below said shoulder, a gage bar movable into said glass tube, and means within said barrel for operating said gage bar, said shield having an opening through which the movements of said gage bar can be seen.

18. In a pressure gage, a body, a rubber air chamber with self-supporting walls on said body, a gage bar having an operative engagement with said air chamber, a barrel inclosing the air chamber, and having an opening through which said gage bar is slidable, a transparent tube on the end of said barrel adapted to receive the end of said gage bar, and a cylindrical shield secured to the barrel over said transparent tube and protecting the same, said shield having segmental openings, and packing at each end of the tube.

In testimony whereof I have hereunto set my hand at Los Angeles, California, this 8th day of August, 1912.

JUNIUS A. BOWDEN.

In presence of—
ARTHUR P. KNIGHT,
F. A. CRANDALL.